(12) United States Patent
O'Shea

(10) Patent No.: US 7,841,559 B1
(45) Date of Patent: Nov. 30, 2010

(54) AERIAL VEHICLE WITH VARIABLE ASPECT RATIO DEPLOYABLE WINGS

(75) Inventor: Hank O'Shea, Thousand Oak, CA (US)

(73) Assignee: MBDA Incorporated, Wesclake Village, CA (US)

( * ) Notice: Subject to any disclaimer, the term of this patent is extended or adjusted under 35 U.S.C. 154(b) by 958 days.

(21) Appl. No.: 11/707,088

(22) Filed: Feb. 16, 2007

Related U.S. Application Data

(60) Provisional application No. 60/773,645, filed on Feb. 16, 2006.

(51) Int. Cl.
*B64C 3/40* (2006.01)

(52) U.S. Cl. .............................. 244/46; 244/49; 244/219

(58) Field of Classification Search ................ 244/218, 244/46, 49, 139, 63
See application file for complete search history.

(56) References Cited

U.S. PATENT DOCUMENTS

| | | | |
|---|---|---|---|
| 25,080 | A | 8/1859 | Goodspeed |
| 2,038,337 | A | 4/1936 | Ballmann |
| 2,858,091 | A * | 10/1958 | Kapenkin ................ 244/218 |
| 3,415,467 | A | 12/1968 | Barringer |
| 3,666,210 | A * | 5/1972 | Look et al. ............... 244/218 |
| 3,942,747 | A | 3/1976 | Wolkovitch |
| 3,990,656 | A | 11/1976 | Minnich |
| 4,053,125 | A | 10/1977 | Ratony |
| 4,090,681 | A | 5/1978 | Zimmer |
| 4,106,727 | A | 8/1978 | Ortell |
| 4,209,147 | A | 6/1980 | Jones, Jr. |
| 4,364,531 | A | 12/1982 | Knoski |
| 4,365,773 | A | 12/1982 | Wolkovitch |
| 4,447,025 | A | 5/1984 | Bock et al. |
| 4,471,923 | A | 9/1984 | Höppner et al. |
| 4,541,593 | A | 9/1985 | Cabrol |
| 4,664,338 | A | 5/1987 | Steuer et al. |
| 4,699,334 | A | 10/1987 | Boeder |
| 4,793,571 | A | 12/1988 | Kranz |
| 4,845,357 | A | 7/1989 | Brennan |

(Continued)

FOREIGN PATENT DOCUMENTS

DE    3710703 A1    10/1988

(Continued)

OTHER PUBLICATIONS http://www.iop.org/EJ/abstract/0964-1726/5/1/002.

(Continued)

*Primary Examiner*—Galen Barefoot
(74) *Attorney, Agent, or Firm*—Kaye Scholer LLP

(57) ABSTRACT

Embodiments of the present invention relate a wing arrangement for an aerial vehicle configured to adjust the vehicles aspect ratio in response to flight mission parameters. The wing arrangement may include a pair of wing assemblies capable of deploying to a first winged position defining a first aspect ratio. Each wing assembly may have a forward inboard wing pivotally connected to the fuselage and an aft inboard wing pivotally connected to the carriage. The forward inboard wing and aft inboard wing of each assembly may be connected, forming a bi-plane configuration. Additionally, the each assembly may include a set of outboard wings configured to telescope from the inboard wings to an extended winged position defining a second aspect ratio greater than the first aspect ratio.

20 Claims, 5 Drawing Sheets

U.S. PATENT DOCUMENTS

| | | | |
|---|---|---|---|
| 4,858,851 A | 8/1989 | Mancini et al. | |
| 4,923,143 A | 5/1990 | Steuer et al. | |
| 4,998,689 A | 3/1991 | Woodcock | |
| 5,029,773 A | 7/1991 | Lecat | |
| 5,039,030 A | 8/1991 | Kraus | |
| 5,078,339 A | 1/1992 | Lapidot | |
| 5,118,052 A | 6/1992 | Alvarez | |
| 5,141,175 A | 8/1992 | Harris | |
| 5,150,864 A | 9/1992 | Roglin et al. | |
| 5,192,037 A | 3/1993 | Moorefield | |
| 5,240,203 A | 8/1993 | Myers | |
| 5,549,260 A | 8/1996 | Reed, III | |
| 5,615,846 A | 4/1997 | Shmoldas et al. | |
| 5,626,312 A | 5/1997 | Head | |
| 5,899,410 A | 5/1999 | Garrett | |
| 5,901,928 A | 5/1999 | Raskob, Jr. | |
| 5,934,967 A | 8/1999 | Brown et al. | |
| 6,065,934 A | 5/2000 | Jacot et al. | |
| 6,078,674 A | 6/2000 | Cattafesta, III et al. | |
| 6,082,672 A | 7/2000 | Audren | |
| 6,135,713 A | 10/2000 | Domzalski et al. | |
| 6,220,550 B1 | 4/2001 | McKillip, Jr. | |
| 6,231,013 B1 | 5/2001 | Jaenker | |
| 6,260,797 B1 * | 7/2001 | Palmer | 244/49 |
| 6,345,792 B2 | 2/2002 | Bilanin et al. | |
| 6,371,415 B1 | 4/2002 | Lorkowski et al. | |
| 6,474,604 B1 | 11/2002 | Carlow | |
| 6,481,667 B1 | 11/2002 | Ho | |
| 6,508,439 B1 | 1/2003 | Fink et al. | |
| 6,601,795 B1 | 8/2003 | Chen | |
| 6,626,398 B1 | 9/2003 | Cox et al. | |
| 6,749,153 B1 | 6/2004 | August | |
| 6,854,686 B2 | 2/2005 | Perlo et al. | |
| 6,978,970 B2 | 12/2005 | Purcell, Jr. | |
| 6,984,109 B2 | 1/2006 | Bagai | |
| 6,986,481 B2 | 1/2006 | Fanucci et al. | |
| 6,991,280 B2 | 1/2006 | McKnight et al. | |
| 7,185,847 B1 * | 3/2007 | Bouchard et al. | 244/46 |
| 7,582,977 B1 * | 9/2009 | Dehlsen | 290/1 R |
| 2001/0010348 A1 | 8/2001 | Bilanin et al. | |
| 2001/0035477 A1 | 11/2001 | Fink et al. | |
| 2004/0129827 A1 | 7/2004 | Perlo et al. | |
| 2004/0217230 A1 | 11/2004 | Fanucci et al. | |
| 2005/0121945 A1 | 6/2005 | Browne et al. | |
| 2005/0151015 A1 | 7/2005 | Cagle et al. | |
| 2006/0027703 A1 | 2/2006 | Bussom et al. | |

FOREIGN PATENT DOCUMENTS

| | | |
|---|---|---|
| DE | 4212201 A1 | 10/1992 |
| FR | 2557065 A | 6/1985 |
| GB | 2203714 A | 10/1988 |
| GB | 2266873 A | 11/1993 |
| RU | 1818272 A | 5/1993 |

OTHER PUBLICATIONS http://www.icase.edu/colloq/data/colloq.Carpenter.Bernie.2002.5.16.html.

http://www.farswing.com/about.html.

http://spiedl.aip.org/getabs/servlet.

* cited by examiner

Sequence: A   B   C   D   E

Sequence:   F                                          G

AERIAL VEHICLE WITH VARIABLE ASPECT RATIO DEPLOYABLE WINGS

This application claims priority to co-pending U.S. Provisional Patent Application 60/773,645, filed Feb. 16, 2006, and entitled "Variable Aspect Ratio Deployable Wings With Self-Contained Aerodynamic Control Surfaces," which is assigned to the assignee of the present invention and is hereby incorporated by reference in its entirety.

FIELD OF THE INVENTION

The present invention relates generally to aerodynamic bodies and, more particularly, to aerodynamic bodies having deployable joined wings with increased aspect ratio and self-contained aerodynamic control.

BACKGROUND OF THE INVENTION

Aerodynamic vehicles, such as aircraft, guided missiles, munitions, and unmanned aerial vehicles, include design parameters that are configured to provide the necessary lift and control to overcome the drag and weight of a vehicle during flight. For example, the aspect ratio ("AR"), the lift coefficient, and the drag coefficient are examples of typical design parameters which affect the performance of an aerodynamic vehicle.

One goal in designing an aerodynamic vehicle is to maximize the lift generated by the aerodynamic surfaces for the drag associated with the overall aerodynamic vehicle design, i.e., maximize the lift to drag ("L/D") ratio. In pursuit of this goal, the AR is considered an important parameter and can be computed as follows:

$$AR = (\text{span})^2/\text{area}$$

wherein the span is the distance from wingtip to wingtip and area is the surface area of the wings.

The AR is an important design parameter because, generally, a wing's ability to generate lift is influenced by changes in aspect ratio. As aspect ratio increases for a given wing design the lift generating capability also increases. Wings with high aspect ratios are more suited for missions requiring long flight times or long distance glide range whereas wings with lower aspect ratio are more suited for missions requiring higher speeds and long distance cruise ranges.

For many aerodynamic vehicles, especially guided missiles, munitions, and unmanned aircraft, variable geometry wings may conflict with other desirable design parameters, such as reduced physical envelope, launch constraints, and/or compact storage (dense packing). One attempt to reconcile these competing interests is taught in U.S. Pat. No. 5,615,846 (the "846 patent"), which is incorporated by reference herein in it entirety, where extended range and increased maneuverability are accomplished through deployable joined wings. During storage and launch, the deployable wings remain tucked against the fuselage of the guided missile, conserving storage space. The deployable wings change geometry and deploy into a diamond shaped joined wing configuration during flight, in some cases tripling the range of an un-powered munition/ordinance or missile. While, the '846 patent effectively combines the advantages of compact storage and deployable wings, the deployed joined wings do not alter the AR of the aerodynamic vehicle during flight for different mission parameters.

Other attempts at variable wing geometries have included telescoping wings that alter the aerodynamic characteristics of the airframe. Previous aerodynamic vehicles using telescoping wings employ a conventional cantilevered wing configuration, where the extending wing provides a means for manipulation of the wings aspect ratio. Unfortunately, cantilevered wings are typically large and heavy and lack the ability to fold or package in a compact and streamlined stowed configuration.

The mechanical complexities of implementing deployable wing systems in a reduced physical volume have prevented a compact arrangement of flight control schemes. Prior attempts to include deployable wings for guided munitions and other flight vehicles have resulted in flight control actuation schemes that, in the case of air launched and ground launched guided munitions, are housed outside of the wing structure. The control actuators are often mounted on the fuselage, for example. Conventionally, when actuation of a control surface on a deployable wing has been required, the means for actuating the deployable control surfaces are complicated due to the mechanical transmission of actuation forces across or through the articulated joints between the fuselage and the wing panels. As such, the aerodynamic control surfaces on deployable wings have suffered from increased part counts, increased cost and reduced reliability.

SUMMARY OF THE INVENTION

One embodiment of the invention includes a wing arrangement for an aerial vehicle having a deployment mechanism configured to attach to a first side of a fuselage and configured to move from a first position to a second position. The wing arrangement may also include a first wing configured to be rotationally coupled to a second side of the fuselage, a second wing configured to be rotationally coupled to the deployment mechanism and rotationally coupled to the first wing, a third wing configured to be rotationally coupled to the second side of the fuselage, and a fourth wing configured to be rotationally coupled to the deployment mechanism and rotationally coupled to the third wing. Movement of the deployment mechanism from the first position to the second position may cause the first and second coupled wings and the third and fourth coupled wings to deploy to a first winged position.

Another embodiment of the invention may include a wing arrangement for an aerial vehicle having a carriage configured to be attached to a fuselage and move from a first position to a second position and a pair of wing assemblies having a stowed position and deployed position. Each wing assembly in the deployed position may include a forward wing configured to be pivotally coupled to the fuselage and arranged on a first side of the fuselage, an aft wing configured to be pivotally coupled to the carriage and arranged on a second side of the fuselage substantially opposite the first side, and a connector pivotally connecting an outboard end of the forward wing and an outboard end of the aft wing. The wing arrangement may also include an actuator coupled to the fuselage and configured to move the carriage from the first position to the second position whereby movement of the carriage to the second position causes the forward wing and the aft wing of each pair of wing assemblies to deploy to the deployed position.

Another embodiment of the invention may include an aerial vehicle having a folding wing arrangement. The aerial vehicle may include a fuselage defining a first side and a second side substantially opposite each other, a carriage connected to the fuselage on the first side and configured to move from a first position to a second position, and pair of wing assemblies having a stowed position and a deployed position. Each wing assembly in the deployed position may include a first wing pivotally connected to the fuselage on the second side and a second wing pivotally connected to the carriage and pivotally connected to the first wing. The aerial vehicle may also include an actuator connected to the fuselage and configured to translate the carriage from the first position to the second position whereby movement of the carriage to the second position causes the first wing and the second wing of each pair of wing assemblies to deploy to the deployed position.

An embodiment of the invention may also include a method of flying an aerial vehicle. The method may include deploying a first set of four deployable wings on an aerial vehicle to a first winged position defining a first aspect ratio, deploying a second set of four deployable wings to a second winged position defining a second aspect ratio that is greater than the first, and flying the aerial vehicle to a destination.

BRIEF DESCRIPTION OF THE DRAWINGS

Examples of the invention will be apparent to those skilled in the art from the following detailed description of preferred embodiments, taken together with the accompanying drawings, in which.

DETAILED DESCRIPTION OF THE DRAWINGS

The present disclosure will now be described more fully with reference to the Figures in which various embodiments of the invention are shown. The subject matter of this disclosure may, however, be embodied in many different forms and should not be construed as being limited to the embodiments set forth herein.

In accordance with one embodiment of the invention, a variable aspect ratio ("AR") deployable wing arrangement is provided for an aerial vehicle. A joined tandem wing arrangement may be configured to unfold from a compact storage configuration to an initial winged position having a first AR. Manipulation of the AR of the aerodynamic vehicle to meet mission or mission phase needs may be accomplished by actuating the deployment of the joined tandem wing from the initial winged position to an extended winged position having a second, higher AR. The extended winged position may be achieved using telescoping outboard wing panels that telescope from inboard wing panels, for example.

Embodiments of the invention provide flexibility through aspect ratio manipulation, making an aerodynamic vehicle suitable for use in varied mission scenarios. For example, a lower AR configuration of a vehicle may benefit a mission or phase of a mission requiring higher speeds and maneuverability. In a deployed and unextended state, the variable AR wing configuration provides a lower AR, enabling low altitude flight where terrain and obstacle avoidance or evasive maneuvers are a necessity. In the event that a mission or phase of a mission calls for long flight distances or long loitering time, for example, the outboard wings may be deployed, allowing the wing vehicle to increase its AR. In one example, the AR may be increased to a maximum of about 14. In some examples of an aerial vehicle with the variable AR wing arrangement, the AR of the fully extended wing arrangement may be more than double the AR of the initial deployed wing arrangement.

In the case of a powered aerial vehicle, such as the Hunter RQ5A Tactical Unmanned Aerial vehicle, for example, the inclusion of a variable AR deployable wing arrangement on the vehicle may extend the flight distances over 500 miles or alternatively flight loiter times of more than 24 hours. In the case of munitions such as bombs and/or missiles, embodiments of the invention may allow personnel and equipment to deliver ordinance from beyond the range of anti-aircraft weaponry or the like, providing increased safety and improving the aerial vehicle's overall mission effectiveness. It should be understood that the fuselage of a munition may include a single ordinance or may carry multiple sub-munitions for delivery of a wide area during flight.

Figure 1:
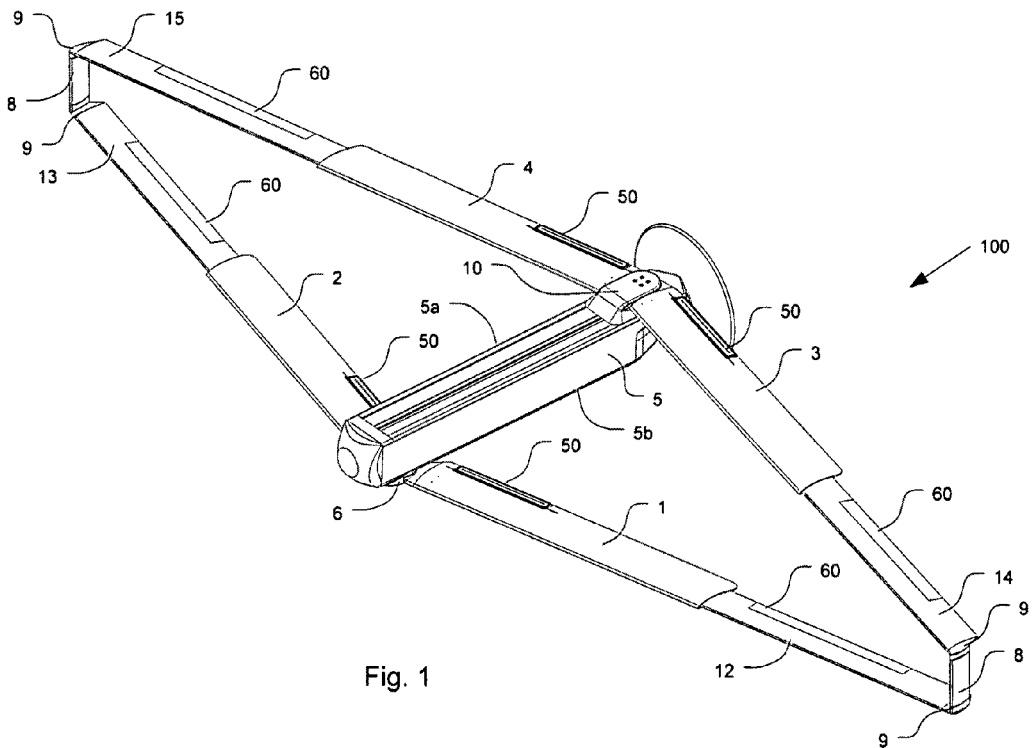
FIG. 1 shows a fully deployed joined wing arrangement in accordance with an embodiment of the invention.

In accordance with embodiments of the invention, a variable AR deployable wing arrangement may be integrated with an aerodynamic body such as a guided missile or munitions or other aerodynamic vehicles. FIG. 1 shows a deployable wing arrangement 100 installed on a small unmanned aerial vehicle or powered munition in accordance with one embodiment of the invention. The wing arrangement 100 is shown in FIG. 1 in an extended wing position. The deployable wing arrangement 100 may be integrated on a long flight time munition, designed for missions requiring the munition to loiter over a designated area for an extended period of time, in some cases greater than 24 hours.

Figure 6:
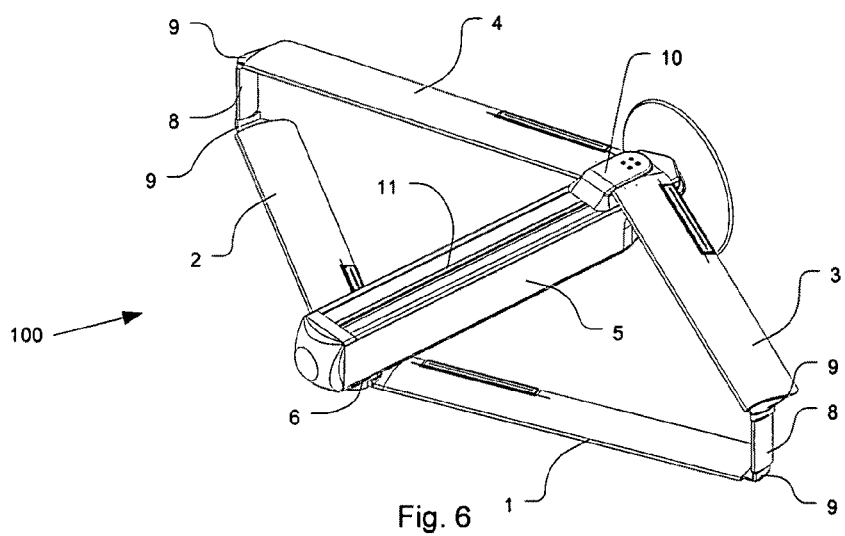
FIG. 6 shows a joined wing arrangement deployed to an initial deployment configuration in accordance with the embodiment of the invention shown in FIG. 1.

The aerial vehicle or munition shown in FIG. 1 includes a fuselage 5. As used herein, the term fuselage is meant to include, but not limited to, a body portion of an aerial vehicle or flying device such as a missile, a munition, a bomb, or an aircraft, for example. When the wings are deployed in the initial winged position, as shown in FIG. 6, the wing arrangement provides a AR of about 6. In the initial winged position, the aerial vehicle may be capable of greater than 60 nautical miles glide range or a powered cruising range greater than 500 miles.

In the extended position shown in FIG. 1, the deployable wing arrangement 100 includes a forward left inboard wing panel 1 and a forward right inboard wing panel 2. Both forward wing panels 1 and 2 are attached to a bottom or lower fixed articulated attachment 6 on the fuselage 5. The deployable wing arrangement also includes an aft left inboard wing panel 3 and an aft right inboard wing panel 4 connected to the movable carriage 10 mounted on the upper or top side 5a of the fuselage 5, as shown in FIG. 1. The forward wing panels 1 and 2 may be connected directly to the fuselage or otherwise configured without using the articulated attachments 6. Additionally, the aft wing panels 3 and 4 may also be connected directly to the fuselage or otherwise configured. The deployable wing arrangement, shown in FIG. 1, is configured in a reverse staggered configuration, where the forward inboard wing panels 1 and 2 are mounded on the bottom of the fuselage during flight. It should be understood that a conventional staggered arrangement may also be used. The reversed staggered arrangement provides the deployment mechanism on top of the fuselage, leaving the bottom of the fuselage available for dispensing of submunitions if necessary.

Each inboard wing panel includes an associated outboard wing panel that may be configured to telescope out of the inboard wing panel. As shown in FIG. 1, the left forward outboard wing panel 12 is associated with the wing panel 1 and the right forward outboard wing panel 13 is associated with the inboard wing panel 2. The left aft outboard wing panel 14 is associated with inboard wing panel 3 and the right aft outboard wing panel 15 is associated with the inboard wing panel 4.

As shown in FIG. 1, the forward wing panels 1, 2, 12 and 13 are swept aft and the aft wing panels 3, 4, 14, and 15 are swept forward. The right side wing panels and the left side wing panels are attached at the tips of the outboard wing panels, for example, wing panels 12 and 14 are connected with a vertical connector 8. The joints between the panel 12 and the vertical panel 8 and between the panel 14 and the vertical panel 8 may be an articulated pivot 9 that allows the vertical panel 8 to rotate relative to the panels 12 and 14 during deployment. The panels 13 and 15 may also be connected with a vertical panel 8 and articulated pivots 9. The fixed articulated attachment 6 and the carriage 10 may also include articulated pivot joints 9 that attach inboard wing panels 1, 2, 3, and 4 to the fuselage 5.

As discussed below, the fuselage 5 includes a deployment track and linear actuator 11 on the topside of the fuselage, as shown in FIG. 1. The linear actuator 11 may be configured to drive the carnage 10 from the front of the fuselage 5 (in a stowed position) to the rear of the fuselage 5 (in a deployed position) as shown in FIG. 1. It should be understood that the deployment track and linear actuator 11 may be separately configured and attached to the aerodynamic vehicle. Alternatively, the deployment track and linear actuator may be integrally formed with the fuselage 5.

Additionally, the articulated attachment 6 and the carriage 10 may be initially positioned at the rear of the fuselage 5 (not shown in the figures) and the carriage 10 may deploy to the front of the fuselage 5. This configuration may experience certain aerodynamic instability during deployment. However, the wing panels may be deployed while suspended from a parachute. While suspended from a parachute, it may be irrelevant for deployment whether the articulated attachment 6 is positioned as shown in FIG. 1, or positioned at the rear of the fuselage 5 (not shown in the figures).

One example of an arrangement of aerodynamic control surfaces is shown on the wing arrangement 100 in FIG. 1. The inboard wings 1, 2, 3, and 4 include control surfaces 50 positioned on the trailing edge of the inboard wings, adjacent to the fuselage. Additionally, the wing arrangement 100 includes control surfaces 60 located on the outboard wings 12, 13, 14, and 15. It should be understood that alternative configurations of controls surfaces may be used, including changing the position, size, number and type of control surface, without deviating from the scope and spirit of the invention. Additionally, it should be understood that a munition or aerial vehicle may include separate flight controls, as part of the propulsion system, for example. As such, the flight control surfaces on the wing arrangement 100 may not be necessary.

The ability of an aerial vehicle to stay aloft for long periods of time may be strongly dependent on the wing aspect ratio, wing loading and resultant lift to drag ratio. The embodiment of the invention shown in FIG. 1 provides an example of minimizing wing loading by maximizing deployed wing area, maximizing aspect ratio by maximizing deployed span, and an maximizing vertical separation of the forward and aft wings to increase lift to drag ratio. This wing arrangement 100 may result in an airframe that, when deployed in the extended wing position, may be capable of flight times over 24 hours.

In the initial deployed position shown in FIG. 1, the inboard wing panels 1, 2, 3, and 4 form a biplane configuration with vertical connector 8 bracing the ends of the wing panels. As understood by those of skill in the art, the efficiency of a biplane arrangement of wings is increased as the vertical separation is increased up to a limit in vertical separation of approximately one chord length. As shown in FIG. 1, the biplane configuration may include vertical separation between the aft swept wings and the forward swept wings, efficiently generate lift. It should be understood that this applies to the wing arrangement in its initial deployed position shown in FIG. 6 and in its extended position shown in FIG. 1.

It should be understood that one embodiment of the invention may include the bi-plane configuration of the wing arrangement 100 shown in FIG. 6 without the telescoping outboard wing panels where the inboard wing panels are directly connected at their tips.

Figure 2:
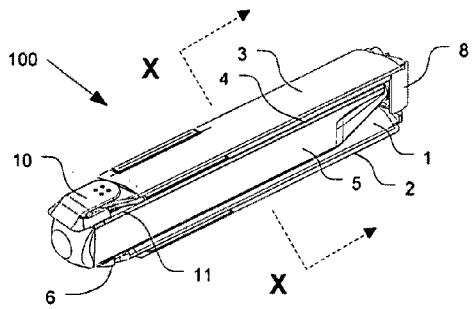
FIG. 2 shows a stowed joined wing arrangement in accordance with the embodiment of the invention shown in FIG. 1.

FIG. 2 shows the deployable wing arrangement 100 in a stowed or folded configuration. The stowed configuration may be used for transportation and handling. Although the wing arrangement may be deployed prior to launch, it is contemplated that the stowed configuration shown in FIG. 2 may be used for air launches and the deployed position for ground launches. In the folded configuration, the carriage 10 is positioned at the front of the fuselage 5. The carriage 10 may be configured to translate along the length of the fuselage 5 using the track and linear actuator 11. The aft inboard wings 3 and 4, connected at the attachment point 7, extend rearward over the top surface of the fuselage 5 in a folded position. Likewise, the forward inboard wings 1 and 2, connected at the fixed carriage 6, extend rearward under the bottom surface 5b of the fuselage 5 in a folded position. As shown in FIG. 2, the inboard wing 3 folds on top of the inboard wing 4 and the inboard wing 2 folds below the inboard wing 1. It should be understood that the outboard wing panels 12, 13, 14, and 15 (not shown in FIG. 2) are nested with the inboard wing panels and therefore not seen when in the stowed position.

As shown in FIG. 2, the vertical connectors 8 (only one of which is visible in FIG. 2) are stowed adjacent to the tail of the fuselage 5. It should be noted that the articulated pivot joints 9 may be configured to position the vertical connectors 8 flush against the side of the fuselage 5. This serves to minimize the physical envelope of the stowed wing arrangement and maintain stable aerodynamic characteristics prior to deployment of the wing arrangement 100. Although not obvious in FIG. 2, the vertical conneecters 8 do not directly connect the corresponding inboard wings, for example, vertical connector panel 8 does not directly connect inboard wing 1 to inboard wing 3. Instead, the vertical connectors 8 connects the tips of the corresponding outboard wing panels, for example, the vertical connector panel 8 connects the outboard wings 12 and 14, which are shown nested in FIG. 2.

It should be noted that the separation of the inboard wings 1 and 2 on the bottom 5b of the fuselage 5 and the inboard wings 3 and 4 on the top 5a of the fuselage 5 allows the span or length of the inboard wings (especially the rear inboard wings 3 and 4) and consequently the outboard wings as well, to be maximized. This is because the fixed articulated attachment 6 and the moving carriage 10 do not have to fit on the same side of the fuselage, allowing the moving carriage 10 the ability to move to the very front of the fuselage 5 in the stowed position. Consequently, the length of the forward inboard wings 1 and 2 and the rear inboard wing 3 and 4 may be maximized along the available length of the fuselage 5.

Figure 3:
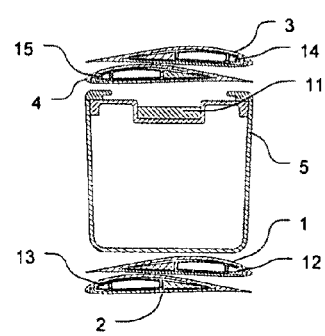
FIG. 3 shows a cross section along line X-X, shown in FIG. 2, of the stowed joined wing arrangement in accordance with the embodiment of the invention shown in FIG. 1.

FIG. 3 shows a cross section along line X-X in FIG. 2 through the fuselage 5, the linear actuator 11, and the inboard and outboard wing panels 12, 13, 14, and 15 of the wing arrangement 100 in the stowed configuration. As shown in FIG. 3, the inboard wings 3 and 4 are not stowed side by side but rather are stacked vertically, one on top of the other. Also, the wing arrangement 100 is configured to nest the wings, for example, the trailing edge of wing 3 is positioned over the leading edge of wing 4 and the trailing edge of wing 4 is positioned under the leading edge of wing 3. The nesting allows the total height of the stowed wings 1, 2, 3, and 4 and the fuselage 5 to be minimized. The stacked and nested arrangement of the wing panels also allows the width of the physical envelope to be minimized while maximizing the chord width of each wing. As shown in FIG. 3, the chord of wing 4, for example, may be configured to be the same as the width of the fuselage, thereby maximizing the chord size for a given fuselage size.

Figure 4:
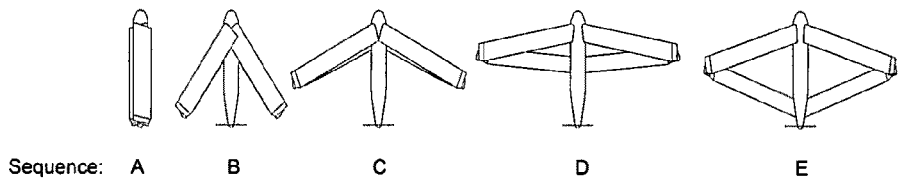
FIG. 4 shows deployment positions for the deployable joined wing arrangement shown in FIG. 1 in accordance with an embodiment of the invention.

FIG. 4 schematically demonstrates an initial deployment at various stages in accordance with one embodiment of the invention. In position A, the wing panels are shown fully stowed. As the movable carriage translates from the front of the fuselage to the rear, the wing panels begin to unfold as shown in positions B and C. Position D illustrates the position of the wing panels when the movable carriage is approximately half way between its stowed position at the front of the fuselage and its deployed position at the rear of the fuselage. Finally, the movable carriage reaches its deployed position in position E, illustrating the deployed position of the four inboard wings. In alternative examples, the wing panels may deployed and flown at intermediate steps between position A and position E, such as position D, for example.

Although the deployment positions discussed with respect to FIG. 4 may be attempted during flight, the transitional aerodynamics of a partially deployed wing arrangement proportioned in an embodiment as shown in wing arrangement 100 may introduce aerodynamic instability. As an alternative, deployment of the wing arrangement may occur while suspended from a parachute. Because the flight controls may be located in the wing arrangement, the aerial vehicle may require deployment of the wings in order to have any active control. However, it is also contemplated that the wing arrangement may be placed on a munition that may not require that the wings be deployed for every mission type.

Figure 5:
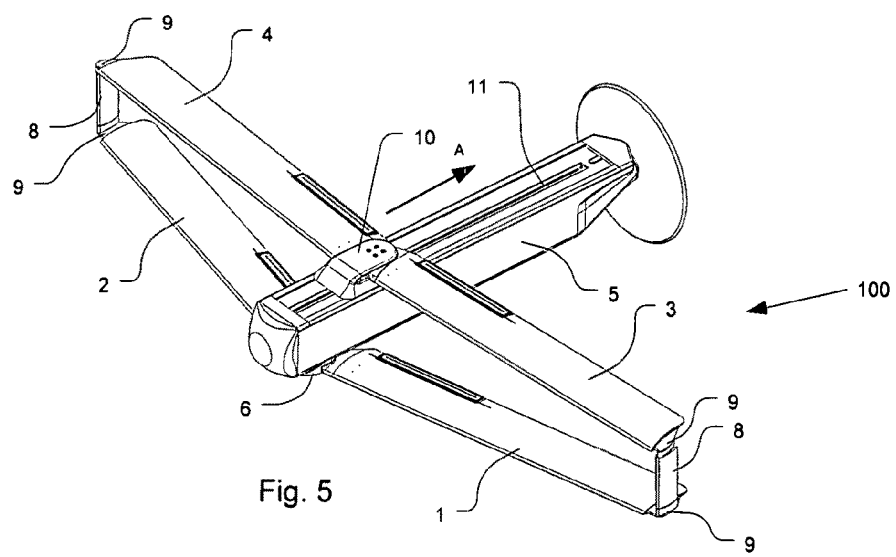
FIG. 5 shows a partially deployed joined wing arrangement in accordance with the embodiment of the invention shown in FIG. 1.

FIGS. 5 and 6 show detailed views of the deployable wing arrangement 100 at two different stages associated with the movement of the movable carriage 10 from the stowed position to the deployed position. As discussed, the aft inboard wing panels 3 and 4 are attached at their roots to the movable carriage 10, which when in the folded or stowed position, lies at its forward most position. During the initial deployment or extension, the movable carriage 10 moves aft by the action of the linear actuator 11. It should be understood that the linear actuator 11 may include linear worm drives, screw drives, smart material linear actuators, or other linear actuators known to those of skill in the art.

Referring to FIG. 5, the rearward movement of the carriage 10 in the direction of arrow A forces the wing panels to unfold. As shown, the inboard wing panels 3 and 4 are attached to the carriage 10 such that, when the carriage 10 moves rearward, the relative geometry of the joined tandem wings forces the inboard wing panels 1, 2, 3, and 4 to pivot out. As would be apparent to those of skill in the art, the connector panels 8 drive the deployment of the front inboard wings 1 and 2 as the inboard wings 3 and 4 deploy. Due to the geometry created by the wing panels acting as struts in a two-member linkage system, each pair of wings on either side of the fuselage form a triangular shape with the fuselage.

Referring to FIG. 6, the initial winged position of the wing arrangement 100 is shown with the carriage 10 deployed to the rear of the fuselage 5 by the linear actuator 11, resulting in a diamond shape formation of the four inboard wing panels 1, 2, 3, and 4. Due to the wing area distributed fore and aft of where the center of gravity is typically located, the static stability of the wing arrangement shown in FIGS. 1 and 6 may be inherently flexible and easily tailored. An aerodynamic designer may have at his disposal design parameters, such as fore and aft wing area distribution, selection of fore and aft sweep angles, and air foil selection.

Figure 7:
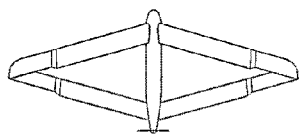
FIG. 7 shows additional deployment positions for the deployable joined wing arrangement shown in FIG. 1 in accordance with an embodiment of the invention.
Figure 7:
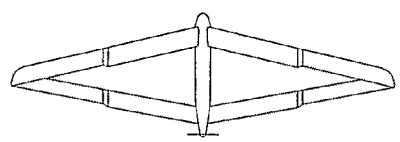

FIG. 7 schematically demonstrates an extended deployment of the outboard wings 12, 13, 14, and 15 in accordance with one embodiment of the invention. As shown, the phase of the extended wing deployment is achieved by telescopic extension of the four outboard wing panels (forward left outboard 12, forward right outboard 13, aft left outboard 14 and aft right outboard 15). When in the stowed position, the outboard panels 12, 13, 14, and 15 are nested within the inboard wing panels as illustrated in FIG. 6.

FIG. 7 and position F illustrate the outboard wing panels telescoping form their stowed position inside the inboard wing panels toward their fully deployed position or the extended winged position. As shown, the outboard wing panels 12, 13, 14, and 15 may be extended synchronously in a controlled fashion to avoid jamming of the wing panels due to resistive loads generated by increased friction between the inboard and outboard panels. It should be understood that the outboard wing panels may be deployed incrementally or partially to a position short of their full extension (as shown in position F, for example) such that the AR of the wing arrangement 100 may be fine-tuned.

FIG. 7 and position G schematically show the outboard wing panels 12, 13, 14, and 15 in the extended winged position and fully deployed. Referring back to FIG. 1, a detailed view of the wing arrangement 100 is shown in the extended winged position with the telescoping outboard wings in full extension. The fully deployed wing arrangement, shown in FIG. 1, includes an AR of about 14, which is more than double the partially deployed wing configuration of the wing arrangement shown in FIG. 6. Additionally, in one example, the wing span of the wing arrangement may be extended from about 76 inches in the initial winged position of FIG. 6 to about 144 inches in the extended winged position of FIG. 1.

Referring to FIG. 6, the wing arrangement 100 may be capable of flight in the initial winged position with an AR of about 6. As such, the wing arrangement 100, as shown in FIG. 6, may be well configured for missions requiring high speeds and long distance cruise ranges. For example, a mission profile suitable for the aerial vehicle and wing arrangement shown in FIG. 6 may include release at high altitude and speed from a carrier aircraft followed by deployment of the wing arrangement to an initial wing position. The mission may also include a mission leg dedicated to providing ingress to a desired location where high speed and maneuverability is needed, such as flying at low altitudes and/or avoiding obstacles. This ingress mission leg may include a maximum range glide or a powered maximum range cruise to an employment destination. A gliding phase of the mission may include deployment of the wings to the initial wing position as shown in FIG. 6 and could provide a glide range performance over 60 nautical miles without consuming on board fuel. Alternatively, the ingress mission leg may require powered cruise to reach the desired locations where ranges of up to 500 nautical miles may be reached. It should be understood that a glide leg and powered cruise leg may also be combined to achieve targets positioned at even greater distances.

Other missions may include releasing the aerial vehicle and wing arrangement and immediately deploying the wing arrangement to the extended wing position shown in FIG. 1. The wing arrangement 100 may be configured with an AR of about 14. Additionally, the wing arrangement 100, as shown in FIG. 1, may be well configured for missions requiring long flight times or long distance glide ranges. For example, an ingress mission leg for the wing arrangement in the extended wing position may include release at high altitude and deployment of the wings to the extended position of wing arrangement 100. After deployment of the wing, the aerial vehicle may use an unpowered glide to an operational altitude. With wing arrangement 100 shown in FIG. 1, a glide range over 100 miles may be achieved. Upon reaching the operation altitude, the aerial vehicle propulsion system may enable powered thrust as necessary for flight mission requirements. For example, the aerial vehicle may be configured to long flight time mission requirements where the aerial vehicle may loiter over an area until commanded to deliver an ordinance. Additionally, the aerial vehicle may immediately deliver an ordinance by un-powered gliding or by powered flight directly to a target.

It is also contemplated that the aerial vehicle may use both the initial wing position and the extended wing position in a single mission. For example, a first ingress mission leg with the wing arrangement in the initial wing position may include delivering the aerial vehicle from a release point to a final destination up to about 500 nautical miles. Once the aerial vehicle has arrived at the final destination, the wing arrangement may be placed in the extended wing position and the aerial vehicle may loiter for up to 24 hours. Other combination of wing positions and gliding and powered flight may be used in accordance with embodiments of the present invention.

The deployment of the inboard wings and outboard wings may be timed to coincide with different stages of a mission flight. For example, an aerial vehicle may include a non-winged propelled stage early in flight after an air or a ground launch. The inboard wings may be deployed to the initial winged position for an initial cruise stage until the aerial vehicle achieves a certain speed or altitude. In another stage of the mission, once all the fuel is used or upon reaching a particular distance or flight condition, for example, the engine or propulsion unit may be shut down and the outboard wings may be deployed to their extended winged position, allowing the aerial vehicle to loiter. In a final stage, the aerial vehicle may glide to its destination, in some cases far beyond the distance the aerial vehicle could have reached under powered flight alone. It should be understood that alternative flight stages, schedules, and configurations of the wing arrangement 100 may be used.

It is contemplated that the mission requirements may include retracting the outboard wings from the extended winged position. For example, after loitering in a particular region, the outboard wings may be retracted to some degree in order to take advantage of the high speed and maneuverability of a lower AR, such as flying at low altitudes and/or avoiding obstacles when approaching a target.

It should be understood that upon full deployment, a portion of the outboard wing panel may remain within the inboard wing panel for structural rigidity. This interface between the inboard panel and the outboard panel provides the necessary structural support through a structural fitting in the root of the outboard wing and mechanical reaction points within the inboard wing that provide a load path for the outboard wing aerodynamic loading.

Figure 8:
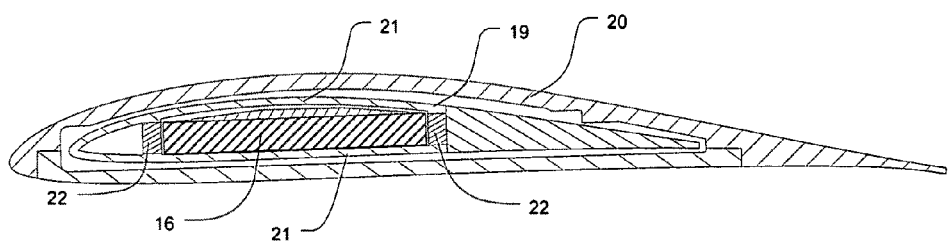
FIG. 8 shows a cross section of the stowed inboard and outboard wing panels in accordance with an embodiment of the invention.

FIG. 8 presents a cross sectional view of the telescoping inboard and outboard wing panels. A linear actuator 16, which drives the extension of the outboard panel, is also shown schematically in FIG. 8. It should be understood that the cross sectional view of FIG. 8, the outboard panel 19 and the inboard panel 20 are representative of the four wing panels 1, 2, 3 or 4 and with their associated nested outboard wing panels.

In FIG. 8, the outboard panel 19 nests within the inboard panel 20. Both panels may be constructed from composite skins bonded onto an internal composite structure comprising two main spars. The chord wise spacing of the spars may be configured to provide the volume necessary to house a linear actuator used to extend the outboard wing panels. However, alternative methods and materials may be used to fabricate the inboard and outboard wings.

A cross section of telescopic panel actuator 16 (used to extend the outboard panel 19) is shown housed in a cavity internal to the outboard panel 19. This cavity is formed by the outboard wing panel skins 21 above and below and by two spars 22 that extend the length of the outboard panel 19.

Figure 9:
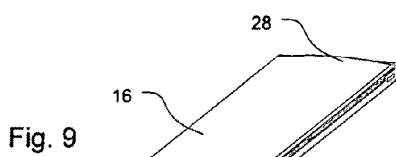
FIG. 9 shows a telescoping linear actuator in accordance with an embodiment of the invention.

FIG. 9 shows a representative volume and mechanism that may be used for the linear actuator 16 for driving the telescoping action of the outboard panels 12, 13, 14, and 15, shown in FIG. 1, in accordance with one embodiment of the invention. The actuator 16 includes an inboard end 18 and an outboard end 28. The inboard end 18 may be secured to the root of the inboard wing, for example inboard wing 1 in FIG. 1. Alternatively, the inboard end 18 may also be secured to the fuselage or other fixed element. As shown in FIG. 8, the length of the actuator 16 is nested inside of the outboard wing 19.

Figure 10:
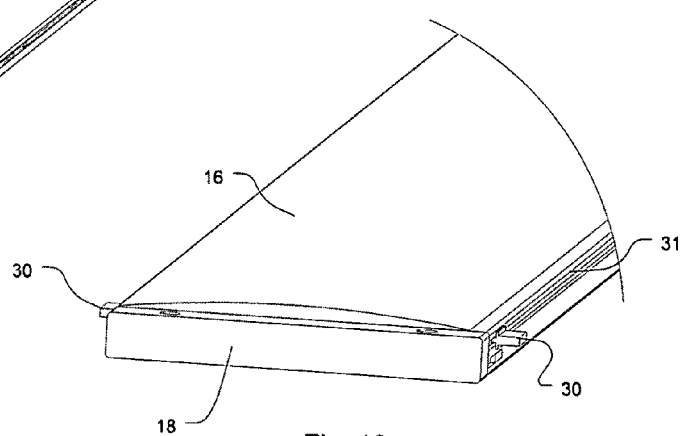
FIG. 10 shows an enlarged view of one end of the telescoping linear actuator shown in FIG. 9 in accordance with an embodiment of the invention.

FIG. 10 shows a blown up detail view of end 18 of the actuator 16 shown in FIG. 9. Tabs 30 may be secured to the inboard portion of the outboard wing 19 and may be configured to translate along slots 31 when the actuator 16 is activated. By attaching the outboard wing panel 19 to the tabs 30, the outboard wing panel 19 telescopes out of the inboard wing panel 20 as the tab 30 moves from the inboard end 18 of the actuator 16 to the outboard end 28. Upon activation and movement of the tabs 30, the deployment of the outboard wings may be effectuated as schematically shown in FIG. 7.

As would be apparent to one of skill in the art, the length of the actuator 16 may vary depending on the desired extension of the outboard wing. Further, it should be understood that different amounts of extension may be available through varying the length of the actuator 16 or by controlling the amount of extension of the actuator 16. Although the linear actuator 16 is shown and described as being used with each pair of inboard and outboard wing panels, it would be apparent to one of ordinary skill in the art that a single linear actuator 16 may be used to drive two connected outboard wing panels to an extended position. Additionally, one actuator 16 may be included as redundant, included for use in the case of failure of a primary actuator.

Other linear actuators may be used to deploy or drive the telescoping action of the outboard wings. For example, the linear actuator 16 may be replaced with a ball screw or cylinder containing gas under pressure to extend the outboard wing panels. The ball screw linear actuator may include a ball screw assembly, similar to aircraft flap drives, where both free ends of the ball screw are secured to the inboard wing and the ball screw is secured to the root of the outboard wing panel.

One example of a pressurized gas system may include configuring the inboard wing as a cylinder and the outboard wing as a piston (not shown in the figures). The gas driven system may then use compressed gas or gas from an onboard generator to pressurize the internal volume of air in the inboard wing panel, creating a piston in a cylinder arrangement where the outboard wing panel acts as the piston and the inboard wing panel acts as the cylinder.

Figure 11:
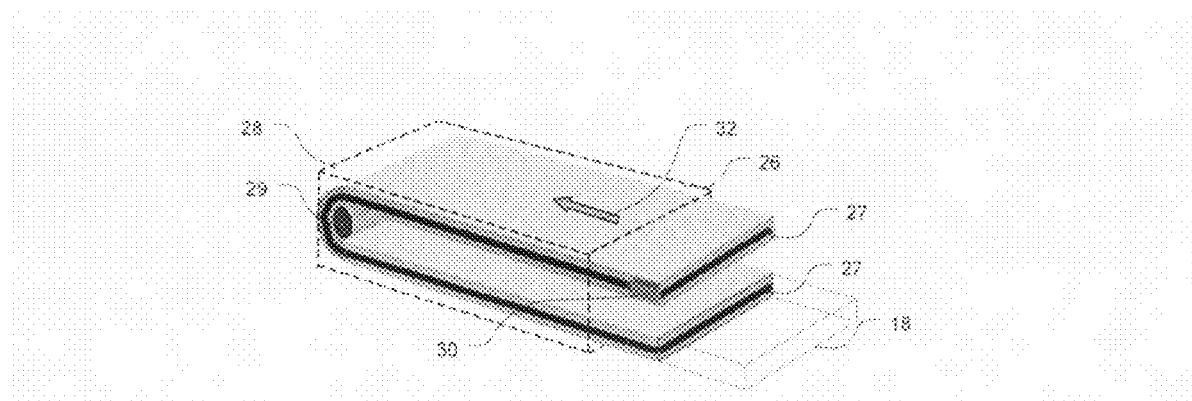
FIG. 11 shows another view of a telescoping linear actuator in accordance with an embodiment of the invention.

FIG. 11 shows a schematic representation of one example of a mechanism for driving the tabs 30 from end 18 to end 28 of the actuator 16 in accordance with one embodiment of the invention. The actuator shown in FIG. 11, for example, may include a box shaped structure 26 in the shape of actuator 16, which functions to support the internal mechanism and the telescoping outboard wing panel. In one embodiment, the structural box 26 may be designed to support an elastic cord 27 that is initially stretched and latched or secured in the position shown in FIG. 11. The cord 27 may extend be secured to the inboard end 18 and extend the length of the actuator, around a pulley 29 located at the outboard end 28, and back the length of the actuator to attach to the movable tabs 30. As would be apparent to those of skill in the art, conventional latches and/or releasable locks may be used to secure the cord 27 under tension until the actuator 16 is activated. In one example, the cord may be constructed from any well known elastomer capable of 300% strain. For example a latex elastomer may be used. The tabs 30 may be bonded to the elastomer and the opposing end of the elastomer may be bonded to the inboard end of the box shaped structure 26. The free end of the elastomer may be stretched from a 16 inches in length, in its free state, to a stretched length of 64 inches. During the stretching process and as the length exceeds 32 inches the elastomer engages the pulley 29 at the outboard end 28. When the full length of 64 inches is reached, conventional latches and/or releasable locks may latch the tabs in place.

When the actuator is activated, the cord 27 may be configured to contract, effectively pulling the tabs 30 in the direction 32 shown in FIG. 11. The cord 27 may be configured to use the stored elastic energy initial stored in the cord during assembly to contract around the pulley 29. By transferring the actuating force to the tabs 30, the root of the outboard wing panel (which is connected to the tabs 30) telescopes outward, extending the outboard wing panel. In one example, the cord 27 may contract to approximately half of its original stretched length, pulling the root of the outboard panel to its fully extended position.

Alternative methods may be used to secure the cord 27 in a stretched condition prior to activation. For example, a shape memory polymer may be applied to cord 27 forming a hybrid cord. The shape memory polymer, such as Veriflex® from CRG Industries, LLC in Dayton, Ohio, may be configured to hold the cord 27 in position. Upon activation by heat or by application of an electrical current, the shape memory polymer may become deformable or elastic, allowing the cord 27 to contract, effectively driving the tabs 30 as discussed above. Once deployed to the desired distance, the shape memory polymer may be allowed to resume a rigid configuration, freezing or locking the tabs 30 in a deployed position. It should be understood that the hybrid cord may be used to deploy the outboard wing panels incrementally, providing an increase in AR as needed.

Aerodynamic control for the vehicle shown in FIG. 1 may be achieved through differential manipulation of the lift of the wing panels through actuation of trailing edge flaps or control surfaces. As shown in FIG. 1, each of the inboard wing panels 1, 2, 3, and 4 include an inboard trailing edge flap 50 and each of the outboard wing panels 12, 13, 14, and 15 include outboard trailing edge flap 60 that provide aerodynamic control. Control actuators may be used to control the position of the trailing edge flaps.

By way of example, fore and aft differential manipulation of the lift between the backward sweeping wing panels (1, 2, 12, and 13 in FIG. 1) and the forward sweeping wing panels (3, 4, 14, and 15 in FIG. 1) may be used to provide pitch control. Right to left differential manipulation of the lift between the right wing panels (2, 4, 13, and 15 in FIG. 1) and left wing panels (1, 3, 12, and 14 in FIG. 1) may be used to provide roll control. Directional control may be achieved through turning moments achieved by a combination the manipulation of lift on the vertically oriented connectors 8, shown in FIG. 1, joining the forward and aft wing panels and differential manipulation of the drag produced by these vertically oriented connectors. It should be understood that small trailing edge flaps and control surfaces, as described below, may also be used on other sections of the wing panels and on the vertical connector panels 8 to provide additional yaw control.

Figure 12:
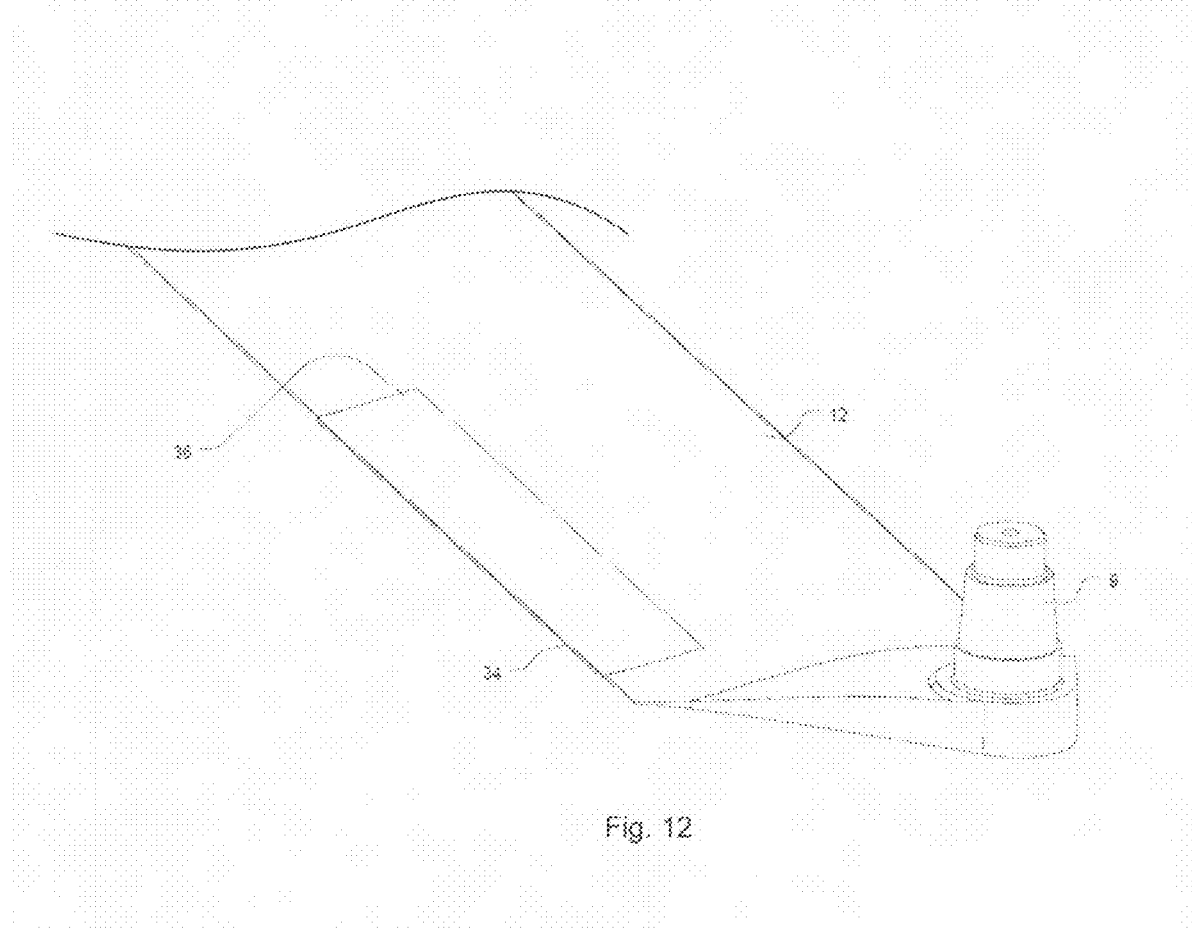
FIG. 12 shows a trailing edge flap actuator in accordance with an embodiment of the invention.

FIG. 12 shows a trailing edge flap 34 that may be used, for example, for the trailing edge flaps 50 and 60 shown in FIG. 1. As shown in FIG. 12, the trailing edge flap 34 is integrated into the trailing edge of an inboard wing panel 12. The inboard wing panel 12 includes a articulated pivot joint 9 and the trailing edge flap 34. A hinge 36 may attach the trailing edge flap 34 to the wing panel 12. The flap 34 may be configured as a high aspect ratio flap where the flap includes a small flap chord compared to the flap span. It should be understood that the trailing edge flap 34 may be sized and shaped according to the size and shape of the aerial vehicle.

One means of controlling the trailing edge flap 34 may include commercially available actuators similar to those used in a remote control airplanes, such as the Futaba Servo Model S3050, manufactured by Futaba Industries in Huntsville, Ala. For example, the remote control actuator may be used to control the trailing edge flap 34. Depending on the size of the aerial vehicle and the size of the servo, the design of the wing panel may require that the servo be positioned external to the wing panel. For example, the servo actuator may be positioned in or on the fuselage and require linkages to connect the actuator to the trailing edge flap.

Figure 13:
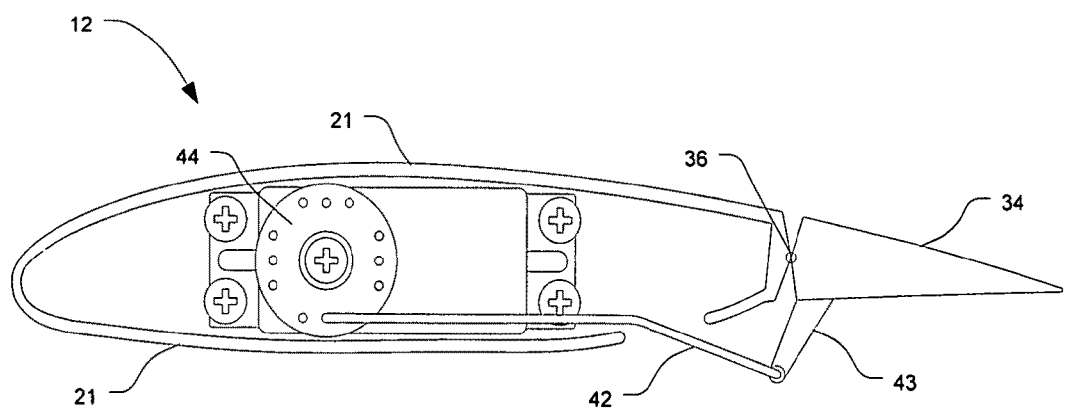
FIG. 13 shows a trailing edge flap and actuator configuration in accordance with an embodiment of the invention.

Alternatively, if the aerial vehicle is sufficiently sized, the servo actuator may be configured and positioned internal the wing. FIG. 13 presents one example of a cross section view of the wing panel 12 and the trailing edge flap 34, illustrating one example of a rotary servo actuator 41, the Futaba Servo Model S3050, installed internal to a wing panel. A linkage 42 may be configured to pass through an opening in the skin 21 and convert the rotary motion of the servo actuator output wheel 44 to linear motion of the linkage 42. The linear motion at the end of the linkage 42 may be transferred into an angular motion at an arm 43 eccentric to the trailing edge flap hinge 36. The servo actuator may then control the deflection of the trailing edge flap 34 about the hinge 36. In one example of the arrangement shown in FIG. 13, the trailing edge flap may be capable of a deflection of 30 degrees up or down. It should be understood that the control surface trailing edge flap and actuator shown in FIG. 13 may be used on other airfoil configurations and on various aerial vehicles in accordance with embodiments of the invention.

Referring back to FIG. 1, the manipulation of lift on the joined tandem wings may be accomplished through the use of trailing edge devices 50, located on the inboard panels 1, 2, 3, and 4, and through the trailing edge devices 60, located on the outboard panels 12, 13, 14, and 15, of the joined tandem wings. As such, deflection of the trailing edge devices may be used to manipulate lift on the inboard or outboard panels and ultimately to manipulate lift for the entire aerial vehicle and the joined pair of tandem wings. Additionally, it should be understood that the number, size, and placement of the control surfaces 50 and 60 shown in FIG. 1 may be changed.

However, as would be apparent to those of skill in the art, alternative combinations of trailing edge devices may be used. For example, the trailing edge flap device shown in FIG. 13 may be exclusively used on all inboard and outboard wing panels. Additionally, various other combinations of trailing edge devices may be used on the inboard and outboard wing panels. It is also contemplated that other control surfaces and aerodynamic controls may be used instead of the trailing edge devices 50 and 60 shown in FIG. 1. By way of example, aerodynamic control may be provided by a propulsion system or by permanent or deployable tail panels (not shown in the figures) mounted at the rear of the fuselage.

The foregoing merely illustrates the principles of the invention. It will thus be appreciated that those skilled in the art will be able to devise numerous other arrangements which embody the principles of the invention and are thus within its spirit and scope.

What is claimed is:

1. A wing arrangement for an aerial vehicle, comprising:
a deployment mechanism configured to attach to a first side of a fuselage and configured to move from a first position to a second position;
a first wing configured to be rotationally coupled to a second side of the fuselage;
a second wing configured to be rotationally coupled to the deployment mechanism and rotationally coupled to the first wing;
a third wing configured to be rotationally coupled to the second side of the fuselage; and
a fourth wing configured to be rotationally coupled to the deployment mechanism and rotationally coupled to the third wing;
wherein:
the wing arrangement has a stowed position, in which:
the deployment mechanism is in the first position;
the first and third wings are stacked on the second side of the fuselage; and
the second and fourth wings are stacked on the first side of the fuselage; and
movement of the deployment mechanism from the first position to the second position causes the first and second coupled wings and the third and fourth coupled wings to deploy to a first winged position.

2. The wing arrangement of claim 1, further comprising:
a fifth wing configured to be telescopingly stowed substantially inside the first wing;
a sixth wing configured to be telescopingly stowed substantially inside the second wing;
a seventh wing configured to be telescopingly stowed substantially inside the third wing; and
an eighth wing configured to be telescopingly stowed substantially inside the fourth wing;
wherein the first and fifth wings are rotationally coupled to the second and sixth wings and the third and seventh wings are rotationally coupled to the fourth and eighth wings.

3. The wing arrangement of claim 2, wherein:
in the first winged position, the fifth, sixth, seventh, and eighth wings are substantially stowed within the first, second, third, and fourth wings respectively and the first winged position defines a first aspect ratio; and
the fifth, sixth, seventh, and eighth wings are configured to telescope out of the first, second, third, and fourth respectively to a second winged position defining a second aspect ratio.

4. The wing arrangement of claim 3, wherein the second aspect ratio that is greater than the first aspect ratio.

5. The wing arrangement of claim 4, wherein the fifth, sixth, seventh, and eighth wings are configured to deploy to an intermediate position defining a third aspect ratio between the first aspect ratio and the second aspect ratio.

6. A wing arrangement for an aerial vehicle, comprising:
a carriage configured to be attached to a fuselage and move from a first position to a second position;
a pair of wing assemblies having a stowed position and deployed position, each wing assembly in the deployed position comprising:
a forward wing configured to be pivotally coupled to the fuselage and arranged on a first side of the fuselage;
an aft wing configured to be pivotally coupled to the carriage and arranged on a second side of the fuselage substantially opposite the first side; and
a connector pivotally connecting an outboard end of the forward wing and an outboard end of the aft wing; and
an actuator coupled to the fuselage and configured to move the carriage from the first position to the second position whereby movement of the carriage to the second position causes the forward wing and the aft wing of each pair of wing assemblies to deploy from the stowed position to the deployed position.

7. The wing arrangement of claim 6, wherein:
the forward wing comprises a forward inboard wing panel in telescoping relation with a forward outboard wing panel;
the aft wing comprises a aft inboard wing panel in telescoping relation with an aft outboard wing panel; and
the connector pivotally connects the forward outboard wing panel to the aft outboard wing panel.

8. The wing arrangement of claim 7, wherein, in the deployed position, the forward outboard wing panel is stowed substantially within the forward inboard wing panel and the aft outboard wing panel is stowed substantially within the aft inboard wing panel and the deployed position defines a first aspect ratio.

9. The wing arrangement of claim 8, wherein the forward outboard wing panel and the aft outboard wing panel are configured to telescope to an extended position defining a second aspect ratio.

10. The wing arrangement of claim 9, wherein the second aspect ratio is greater than the first aspect ratio.

11. An aerial vehicle having a folding wing arrangement, comprising:
a fuselage defining a first side and a second side substantially opposite each other;
a carriage connected to the fuselage on the first side and configured to move from a first position to a second position;

a pair of wing assemblies having a stowed position and a deployed position, each wing assembly in the deployed position comprising:
  a first wing pivotally connected to the fuselage on the second side; and
  a second wing pivotally connected to the carriage and pivotally connected to the first wing; and
an actuator connected to the fuselage and configured to translate the carriage from the first position to the second position whereby movement of the carriage to the second position causes the first wing and the second wing of each pair of wing assemblies to deploy from the stowed position to the deployed position.

12. The aerial vehicle of claim 11, wherein:
the first wing comprises a first inboard wing panel in telescoping relation with a first outboard wing panel; and
the second wing comprises a second inboard wing panel in telescoping relation with a second outboard wing panel, the second outboard wing panel being pivotally connected to the forward outboard wing panel.

13. The aerial vehicle of claim 12, wherein, in the deployed position, the first outboard wing panel is stowed substantially within the first inboard wing panel and the second outboard wing panel is stowed substantially within the second inboard wing panel and the deployed position defines a first aspect ratio.

14. The aerial vehicle of claim 13, wherein the first outboard wing panel and the second outboard wing panel are configured to telescope to an extended winged position defining a second aspect ratio.

15. The aerial vehicle of claim 14, wherein the second aspect ratio is greater than the first aspect ratio.

16. The aerial vehicle of claim 11, wherein the aerial vehicle is at least one of a missile, a munition, a bomb, or an aircraft.

17. A wing arrangement for an aerial vehicle, comprising:
a deployment mechanism configured to attach to a first side of a fuselage and configured to move from a first position to a second position;
a first wing configured to be rotationally coupled to a second side of the fuselage;
a second wing configured to be rotationally coupled to the deployment mechanism and rotationally coupled to the first wing;
a third wing configured to be rotationally coupled to the second side of the fuselage; and
a fourth wing configured to be rotationally coupled to the deployment mechanism and rotationally coupled to the third wing;
a fifth wing configured to be telescopingly stowed substantially inside the first wing;
a sixth wing configured to be telescopingly stowed substantially inside the second wing;
a seventh wing configured to be telescopingly stowed substantially inside the third wing; and
an eighth wing configured to be telescopingly stowed substantially inside the fourth wing;
wherein:
  the first and fifth wings are rotationally coupled to the second and sixth wings and the third and seventh wings are rotationally coupled to the fourth and eighth wings;
  movement of the deployment mechanism from the first position to the second position causes the first and second coupled wings and the third and fourth coupled wings to deploy to a first winged position.

18. The wing arrangement of claim 17, wherein:
in the first winged position, the fifth, sixth, seventh, and eighth wings are substantially stowed within the first, second, third, and fourth wings respectively and the first winged position defines a first aspect ratio; and
the fifth, sixth, seventh, and eighth wings are configured to telescope out of the first, second, third, and fourth respectively to a second winged position defining a second aspect ratio.

19. The wing arrangement of claim 18, wherein the second aspect ratio that is greater than the first aspect ratio.

20. The wing arrangement of claim 19, wherein the fifth, sixth, seventh, and eighth wings are configured to deploy to an intermediate position defining a third aspect ratio between the first aspect ratio and the second aspect ratio.

* * * * *